(12) United States Patent
Tayebati

(10) Patent No.: US 6,310,315 B1
(45) Date of Patent: Oct. 30, 2001

(54) REWORKABLE LASER WELDING PROCESS

(75) Inventor: Parviz Tayebati, Watertown, MA (US)

(73) Assignee: CoreTek, Inc., Wilmington, MA (US)

( * ) Notice: Subject to any disclaimer, the term of this patent is extended or adjusted under 35 U.S.C. 154(b) by 0 days.

(21) Appl. No.: 09/189,619

(22) Filed: Nov. 9, 1998

(51) Int. Cl.$^7$ .................................................. B23K 26/00
(52) U.S. Cl. ........................ 219/121.64; 219/121.63; 219/121.85
(58) Field of Search .................. 219/121.64, 121.63, 219/121.11, 121.6, 121.61, 121.78, 121.79, 121.12, 121.13, 121.73

(56) References Cited

U.S. PATENT DOCUMENTS

| | | | |
|---|---|---|---|
| 5,268,556 | * 12/1993 | Coyle, Jr. et al. | 219/121.76 |
| 5,475,246 | * 12/1995 | Wei et al. | 257/291 |
| 5,493,076 | * 2/1996 | Levite et al. | 174/261 |
| 5,624,585 | * 4/1997 | Haruta et al. | 219/121.63 |
| 5,821,493 | * 10/1998 | Beyer et al. | 219/127.46 |

* cited by examiner

Primary Examiner—M. Alexander Elve
(74) Attorney, Agent, or Firm—Pandiscio & Pandiscio

(57) ABSTRACT

A reworkable laser welding process for welding a first element to a second element.

10 Claims, 5 Drawing Sheets

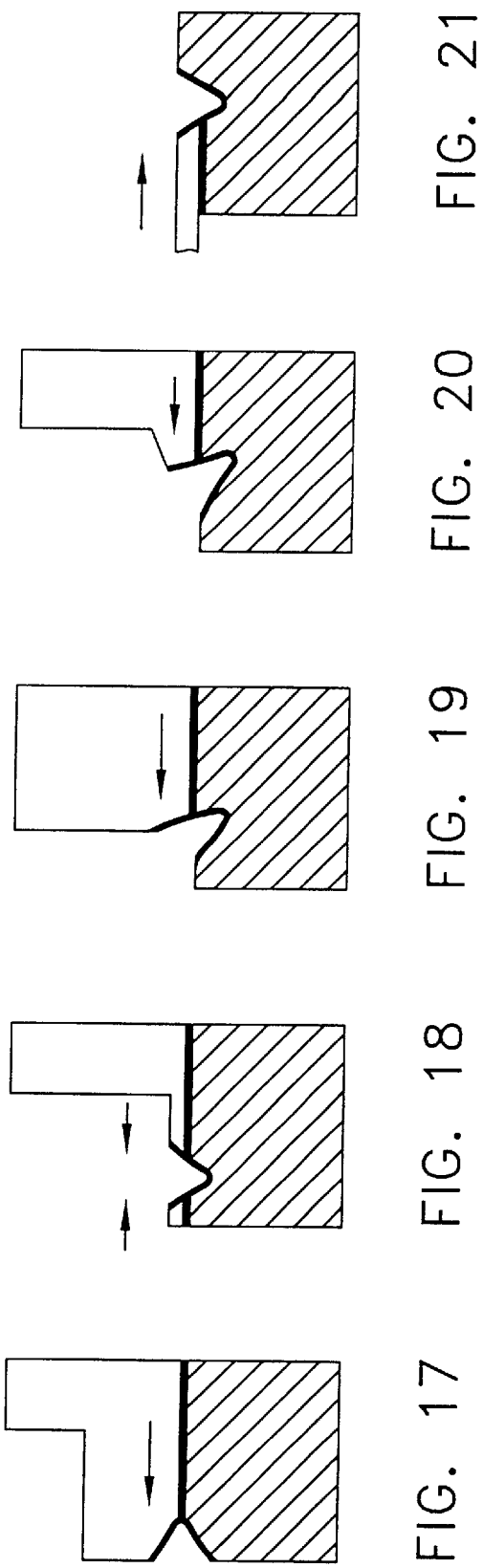

REWORKABLE LASER WELDING PROCESS

FIELD OF THE INVENTION

This invention relates to welding processes in general, and more particularly to laser welding processes.

BACKGROUND OF THE INVENTION

Laser welding is rapidly becoming a common way to manufacture small electronic devices, including, in particular, optoelectronic devices.

More particularly, laser welding is commonly used to fasten together two metal elements, by subjecting a contact point to laser radiation such that a spot weld is formed.

Several different types of spot welds can be formed, depending on the nature of the elements which are being connected. By way of example but not limitation, a so-called "butt weld" is shown in FIG. 1; a so-called "lap weld" is shown in FIG. 2; a so-called "fillet weld" is shown in FIG. 3; a so-called "hybrid fillet-lap weld" is shown in FIG. 4; and a so-called "butt-lap weld" is shown in FIG. 5.

With conventional laser welding, the laser radiation is typically provided in the form of a 1 millisecond pulse from a 0.2–20.0 joule laser, operating at a wavelength of 0.3–10.0 microns. Currently, the most popular laser for laser welding is believed to be a Neodymium YAG laser operating at a wavelength of 1.06 micron.

Laser welding is popular due to its robustness and manufacturability.

Unfortunately, laser welding also suffers from a number of disadvantages.

One major disadvantage of laser welding involves so-called "post weld shift". In such post weld shift, the laser spot weld contracts during the cooling process, which causes a pulling of an element toward the spot weld.

More particularly, in a typical application, one metal element (i.e., a "part") is being mounted on a second metal element (i.e., a "substrate"). Post weld shift causes the part to move on the substrate. By way of example but not limitation, typical post weld shift with a butt weld is shown in FIG. 6; typical post weld shift with a lap weld is shown in FIG. 7; typical post weld shift with a fillet weld is shown in FIG. 8; typical post weld shift with a hybrid fillet-lap weld is shown in FIG. 9; and typical post weld shift with a butt-lap weld is shown in FIG. 10.

Post weld shift can present a serious problem in the manufacture of electronic devices where part positioning must be extremely precise.

By way of example but not limitation, many optoelectronic devices require various components to be aligned with substantial precision, and post weld shift can disrupt such precise alignment.

By way of further example but not limitation, FIG. 11 shows a fiberoptic element being mounted on a substrate, so that the fiberoptic element will receive and transmit light generated by a semiconductor laser which is also mounted on the substrate. In such a situation, alignment between the fiberoptic element and the laser can be crucial for proper functioning of the complete assembly. In such a situation, it is also common for the fiberoptic element to be lap welded to the substrate. Unfortunately, however, post weld shift can cause the positioning of the fiberoptic element to shift as the various lap welds cool, thereby causing mis-alignment between the parts.

For many optoelectronic devices, such part mis-alignment can effectively ruin the device, thereby decreasing manufacturing yield and increasing production costs.

As a result, a number of different techniques have been developed to counteract the effect of post weld shift.

One such technique involves the use of so-called "symmetrical welding". Here, two or more lasers, of equal power, simultaneously effect the laser welding from different directions, so as to reduce the magnitude of any part movement due to post weld shift.

Unfortunately, however, not all types of laser welds lend themselves to such symmetrical welding. See, for example, FIG. 11, where lap welds are used to fasten the fiberoptic element to the substrate. In this situation, all of the lap welds are formed using laser beams which emanate from substantially the same direction, i.e., substantially perpendicular to the plane of the substrate. Thus, in this situation, there is no opportunity to use opposed laser beams to counteract the effect of post weld shift.

Another technique for counteracting post weld shift involves the use of so-called "laser hammering". With laser hammering, after the initial welding process has been completed, and the effect of any initial post weld shift has been determined, a selected one or more of the laser beams is then re-activated, at the same weld spots, so as to re-heat the spot weld and thereby "pull" the part toward the spot weld. Through selective use of such laser hammering, misaligned parts can sometimes be brought back into alignment.

Unfortunately, however, there are limitations on the extent to which laser hammering can be used to correct post weld shift. More particularly, it has been found that as laser hammering is repeatedly used on a particular spot weld, it becomes progressively more and more difficult to move the part, until eventually the effect of laser hammering on a particular spot weld becomes negligible.

OBJECTS OF THE PRESENT INVENTION

Accordingly, the primary object of the present invention is to provide a reworkable laser welding process which addresses the aforementioned problems associated with prior art laser welding.

And another object of the present invention is to provide a reworkable laser welding process which can be used to precisely attach a first element to a second element.

SUMMARY OF THE INVENTION

These and other objects are addressed by the present invention, which comprises a reworkable laser welding process wherein complete or partial laser ablation can be used to vaporize some or all of an existing spot weld, whereupon a part can be repositioned on a substrate and then made fast with further laser welding.

BRIEF DESCRIPTION OF THE DRAWINGS

These and other objects and features of the present invention will be more fully disclosed or rendered obvious by the following detailed description of the preferred embodiments of the invention, which are to be considered together with the accompanying drawings wherein like numbers refer to like parts, and further wherein:

FIG. 17 is a schematic view illustrating partial laser ablation of an exemplary butt weld;

FIG. 18 is a schematic view illustrating partial laser ablation of an exemplary lap weld;

FIG. 19 is a schematic view illustrating partial laser ablation of an exemplary fillet weld;

FIG. 20 is a schematic view illustrating partial laser ablation of an exemplary hybrid fillet-lap weld; and FIG. 21 is a schematic view illustrating partial laser ablation of an exemplary butt-lap weld.

DETAILED DESCRIPTION OF THE PREFERRED EMBODIMENTS

In the present invention, it has been discovered that laser ablation can be used to "erase", either fully or partially, an existing spot weld.

More particularly, it has been discovered that laser ablation of an existing spot weld can be achieved using extremely short pulses of a high power laser. These laser pulses are used to vaporize, either fully or partially, the existing spot weld.

By way of example but not limitation, it has been discovered that nanosecond pulses, for a quadrupled YAG laser, operating at a wavelength of 266 nanometers, can be used to deliver gigawatts of peak power to erase, either fully or partially, an existing spot weld.

In the present invention, it has also been discovered that this ability to "erase", either fully or partially, an existing spot weld can be utilized to rework a previously effected laser weld. More particularly, where a part has been laser welded to a substrate, and post weld shift has caused the part to become mis-positioned on the substrate, laser ablation can be used to "erase", either fully or partially, an existing spot weld, thereby permitting the part to be repositioned on the substrate. After the part has been properly repositioned on the substrate, it can then be rewelded in place using traditional laser welding techniques.

And if, after such rewelding, it is discovered that the part is still not properly positioned on the substrate, the foregoing reworking process can be repeated, as necessary, until the part is properly positioned on the substrate.

As noted above, laser ablation can be used to "fully erase" an existing spot weld.

Figure 5:
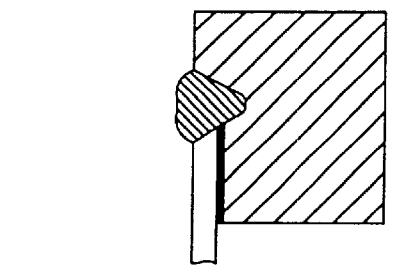
FIG. 5 is a schematic view illustrating an exemplary butt-lap weld.
Figure 4:
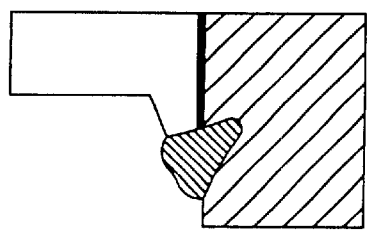
FIG. 4 is a schematic view illustrating an exemplary hybrid fillet-lap weld.
Figure 3:
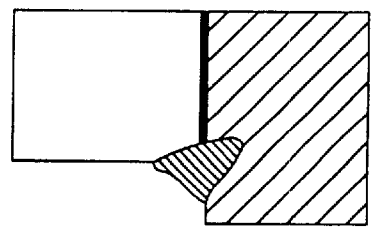
FIG. 3 is a schematic view illustrating an exemplary fillet weld.
Figure 2:
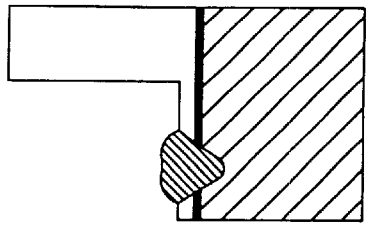
FIG. 2 is a schematic view illustrating an exemplary lap weld.
Figure 1:
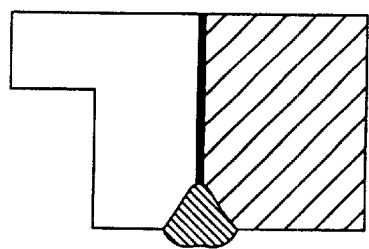
FIG. 1 is a schematic view illustrating an exemplary butt weld.
Figure 10:
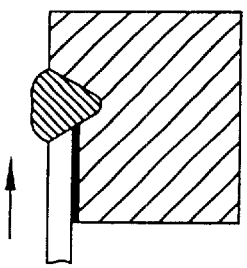
FIG. 10 is a schematic view illustrating typical post weld shift with an exemplary butt-lap weld.
Figure 9:
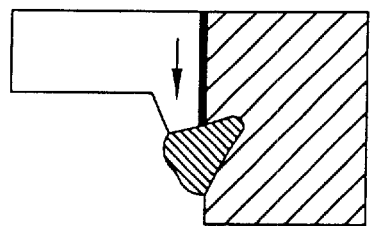
FIG. 9 is a schematic view illustrating typical post weld shift with an exemplary hybrid fillet-lap weld.
Figure 8:
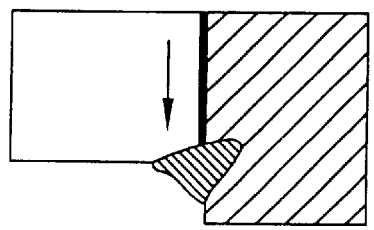
FIG. 8 is a schematic view illustrating typical post weld shift with an exemplary fillet weld.
Figure 7:
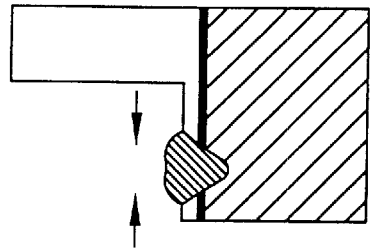
FIG. 7 is a schematic view illustrating typical post weld shift with an exemplary lap weld.
Figure 6:
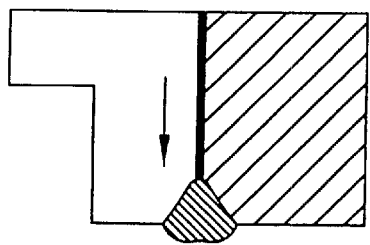
FIG. 6 is a schematic view illustrating typical post weld shift with an exemplary butt weld.
Figure 11:
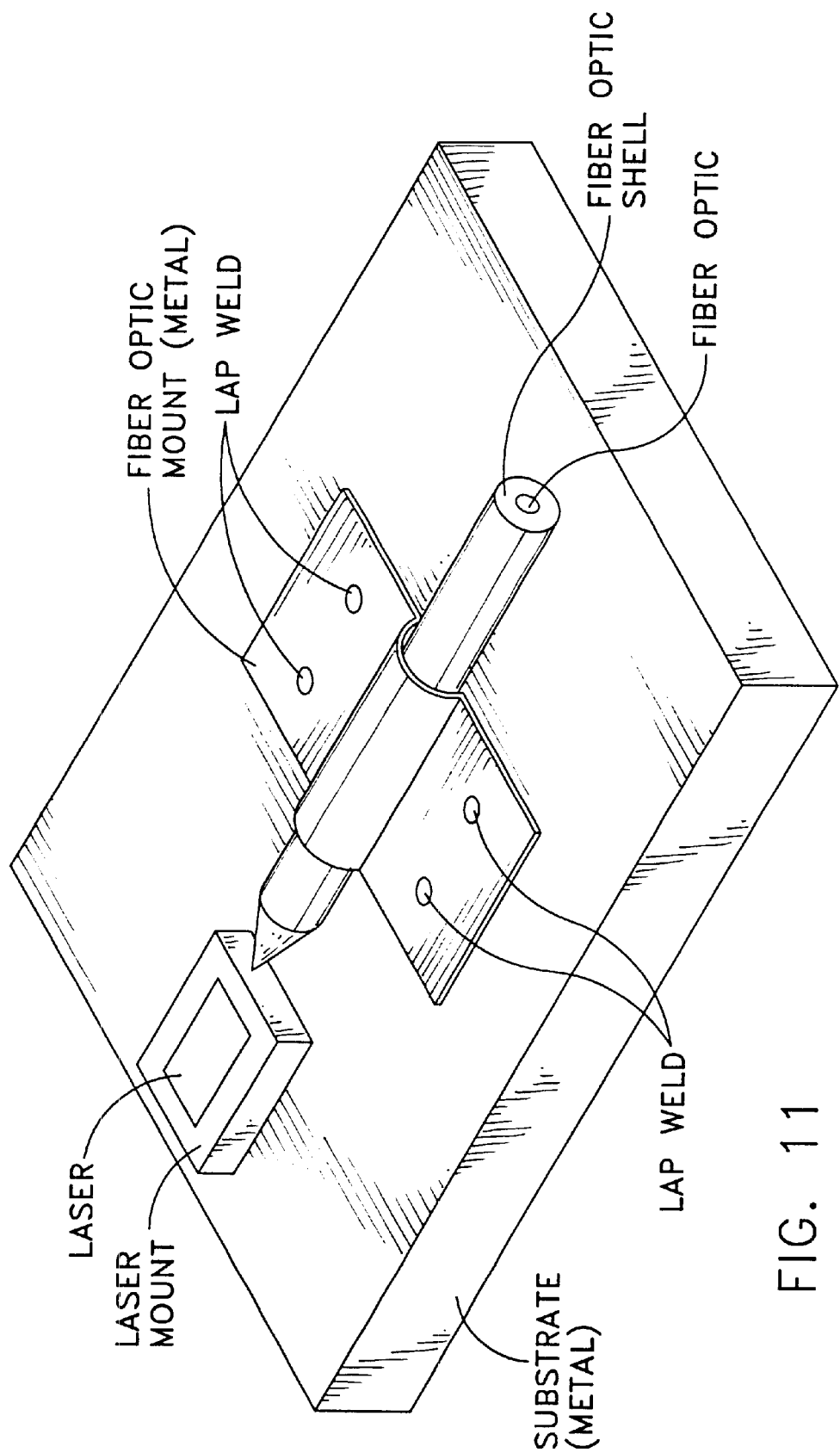
FIG. 11 is a schematic view illustrating a typical laser welding application.
Figure 12:
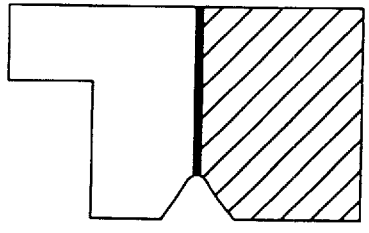
FIG. 12 is a schematic view illustrating full laser ablation of an exemplary butt weld.
Figure 13:
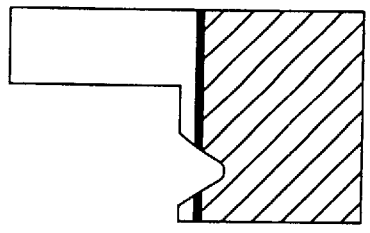
FIG. 13 is a schematic view illustrating full laser ablation of an exemplary lap weld.
Figure 14:
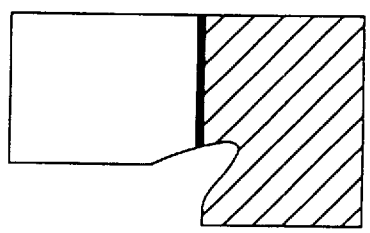
FIG. 14 is a schematic view illustrating full laser ablation of an exemplary fillet weld.
Figure 15:
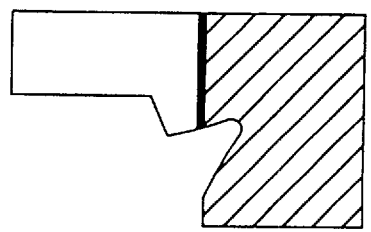
FIG. 15 is a schematic view illustrating full laser ablation of an exemplary hybrid fillet-lap weld.
Figure 16:
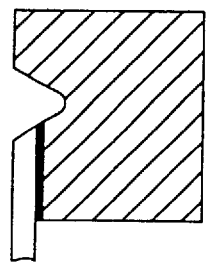
FIG. 16 is a schematic view illustrating full laser ablation of an exemplary butt-lap weld.

By way of example but not limitation, full laser ablation of an exemplary butt weld is shown in FIG. 12; full laser ablation of an exemplary lap weld is shown in FIG. 13; full laser ablation of an exemplary fillet weld is shown in FIG. 14; full laser ablation of an exemplary hybrid fillet-lap weld is shown in FIG. 15; and full laser ablation of an exemplary butt-lap weld is shown in FIG. 16.

Once the existing spot weld has been "fully erased" using such laser ablation, the part can be repositioned on the substrate, and then the part can be rewelded in place using traditional laser welding techniques.

Laser ablation can also be used to "partially erase" an existing spot weld.

By way of example but not limitation, partial laser ablation of an exemplary butt weld is shown in FIG. 17; partial laser ablation of an exemplary lap weld is shown in FIG. 18; partial laser ablation of an exemplary fillet weld is shown in FIG. 19; partial laser ablation of an exemplary hybrid fillet-lap weld is shown in FIG. 20; and partial laser ablation of an exemplary butt-lap weld is shown in FIG. 21.

Once the existing spot weld has been "partially erased" using laser ablation so that the strength of the existing spot weld is thereby weakened, the part can be repositioned on the substrate, and then the part can be secured in place with further welding, e.g., using traditional laser welding techniques.

It will be appreciated that the present invention can be utilized in various ways.

By way of example but not limitation, where a single spot weld is used to attach a part to a substrate, and where the position of that part subsequently needs to be adjusted on the substrate, full laser ablation can be used to completely eliminate the existing spot weld, or partial laser ablation can be used to weaken the existing spot weld, whereupon the part can be repositioned on the substrate (e.g., by conventional mechanical means) before the part is rewelded in its proper position.

By way of further example but not limitation, where multiple spot welds are used to attach a part to a substrate, and where the position of that part subsequently needs to be adjusted on the substrate, full laser ablation can be used to completely eliminate some or all of the existing spot welds, or partial laser ablation can be used to weaken some or all of the existing spot welds, or a combination of the two can be used, whereupon the part can be repositioned on the substrate (e.g., with conventional mechanical means) before the part is rewelded in its proper position.

In connection with the foregoing latter example, it should also be appreciated that where one or more spot welds remain, either fully or partially, after laser ablation, laser hammering may be performed on one or more of these remaining spot welds so as to effect the desired part repositioning.

It should also be appreciated that the aforementioned reworkable laser welding process is not limited to applications where post weld shift has caused a part to become mis-positioned on a substrate. In fact, the aforementioned reworkable laser welding process may be used in any situation where laser welding has been used to fasten a first element to a second element, and the two elements are subsequently found to be mis-positioned relative to one another.

ADVANTAGES OF THE PRESENT INVENTION

Numerous advantages are achieved through the use of the present invention.

Among other things, the present invention provides a reworkable laser welding process which addresses the aforementioned problems associated with prior art laser welding.

And the present invention provides a reworkable laser welding process which can be used to precisely attach a first element to a second element.

Still other advantages of the invention will be obvious to a person skilled in the art.

What is claimed is:

1. A method for fully erasing a laser spot weld, comprising the step of subjecting the spot weld to laser ablation such that the spot weld is fully ablated.

2. A method for welding a first element to a second element, comprising the steps of:
   (1) subjecting a contact point between the first element and the second element to laser radiation such that a first spot weld is formed;
   (2) subjecting the first spot weld to laser ablation such that the first spot weld is fully ablated; and
   (3) subjecting a contact point between the first element and the second element to laser radiation such that a second spot weld is formed.

3. A method according to claim 2 further comprising, after step 2 and before step 3, the additional step of repositioning the first element relative to the second element before the second spot weld is formed.

4. A method according to claim 2 wherein the second element comprises a substrate and the first element comprises a part being mounted to the substrate.

5. A method for partially erasing a laser spot weld, comprising the step of subjecting the spot weld to laser ablation such that the spot weld is partially ablated.

6. A method for welding a first element to a second element, comprising the steps of:
   (1) subjecting a contact point between the first element and the second element to laser radiation such that a first spot weld is formed;
   (2) subjecting the first spot weld to laser ablation such that the first spot weld is partially ablated; and
   (3) subjecting a contact point between the first element and the second element to laser radiation such that a second spot weld is formed.

7. A method according to claim 6 further comprising, after step 2 and before step 3, the additional step of re-positioning the first element relative to the second element before the second spot weld is formed.

8. A method according to claim 6 wherein the second element comprises a substrate and the first element comprises a part being mounted to the substrate.

9. A method for welding a first element to a second element, comprising the steps of:
   (1) subjecting a first contact point between the first element and the second element to laser radiation such that a first spot weld is formed, and subjecting a second contact point between the first element and the second element to laser radiation such that a second spot weld is formed;
   (2) subjecting the first spot weld to laser ablation such that the first spot weld is at least partially ablated;
   (3) subjecting the second spot weld to laser hammering such that the position of the first element is adjusted relative to the second element; and
   (4) subjecting a third contact point between the first element and the second element to laser radiation such that a third spot weld is formed.

10. A method according to claim 9 wherein the second element comprises a substrate and the first element comprises a part being mounted to the substrate.

* * * * *

UNITED STATES PATENT AND TRADEMARK OFFICE
CERTIFICATE OF CORRECTION

PATENT NO. : 6,310,315 B1  
APPLICATION NO. : 09/189619  
DATED : October 30, 2001  
INVENTOR(S) : Parviz Tayebati Page 1 of 1

It is certified that error appears in the above-identified patent and that said Letters Patent is hereby corrected as shown below:

On the Title Page  
Item [73], Assignee, delete "CoreTeck, Inc." and insert --CoreTek, Inc.--

Signed and Sealed this  
Thirty-first Day of May, 2011

David J. Kappos  
*Director of the United States Patent and Trademark Office*